March 15, 1966 W. BOTHE 3,240,307
MULTIPLE DISC CLUTCH WITH INDICATING MEANS
Filed Oct. 3, 1963 2 Sheets-Sheet 1

Inventor:
W. Bothe

United States Patent Office 3,240,307
Patented Mar. 15, 1966

3,240,307
MULTIPLE DISC CLUTCH WITH
INDICATING MEANS
Werner Bothe, Buderich, near Dusseldorf, Germany, assignor to Firma Maschinenfabrik Hasenclever Aktiengesellschaft
Filed Oct. 3, 1963, Ser. No. 313,623
Claims priority, application Germany, Oct. 8, 1962,
M 54,422
6 Claims. (Cl. 192—85)

This invention relates to a multiple disc clutch, particularly to a control cylinder for presses or other machine tools.

Multiple disc clutches are used, for instance, to enable a connection or disconnection between a drive unit and the crankshaft of the ram in a crank press. In view of the high torque to be transmitted, these clutches have annular discs, which are axially slidably mounted in alternation on the toothed inside surface of the clutch housing and on an annular series of teeth provided on the crankshaft. Friction linings disposed between the various annular discs ensure the required friction in the engaged position of the clutch. To engage the coupling, the discs are compressed by a piston, which is disposed in a control cylinder mounted on the clutch housing and has an extension which bears on the outermost annular disc. Because the friction linings between the discs are subjected to a certain wear, as a result of which they are continually decreased in thickness, the displacement of the piston in the control cylinder will increase in the course of time. This results in an increase in the consumption of pressure fluid, such as compressed air, because the volume of the space to be filled adjacent to the piston increases steadily. When relatively large amounts of compressed air must be used, a rapid venting of the control cylinder is rendered more difficult. Rapid venting is necessary, however, to ensure an instantaneous disengagement of the clutch and to enable a stopping of the ram always in the same position. Hence, the wear of the friction linings has detrimental results because more compressed air is consumed so that the operating costs are increased; besides, the speed of the clutch operation is reduced.

It is an object of the invention to provide simple means for compensating the wear of the friction linings in multiple disc clutches so that the consumption of pressure fluid is not substantially increased and the times required for engaging and disengaging the clutch remain constant as far as possible. According to the invention, this is achieved in a simple and advantageous manner in that the piston which is contained in the control cylinder and acts on the discs of the clutch is arranged to be controlled by a compressed air cylinder by means of a liquid, which can be replenished by a refilling device. The piston rod of the compressed air cylinder is suitably provided with a bore and a filling pipe for refilling liquid for the control cylinder. A scale enabling a reading of the liquid level in the control cylinder may be provided on the piston rod of the compressed air cylinder.

The compressed air cylinder, which is an attachable element, ensures an advantageous reduction of the consumption of air which is required to fill the cavity between the control piston and the bottom end of the clutch, and which constantly increases with the wear of the friction linings. This object is substantially accomplished in that the clearance space is filled with hydraulic oil. The small, air-admitting piston of the compressed air cylinder displaces the control piston by means of the hydraulic oil, which fills the cavity adjoining this piston. When the cavity has increased as a result of the wear of the friction linings, the missing oil can easily be refilled through a bore in the piston rod. The liquid level can be read from a scale provided on the piston rod.

It is a further feature of the invention to arrange at the end of the compressed air cylinder an elastic buffer ring for braking the piston. Because the clutch housing rotates with the driving gear, the compressed air cylinder is suitably rotatably mounted on the cylinder cover of the control cylinder so that the compressed air cylinder remains stationary and no difficulty is involved in the supply of air. For this purpose, the cylinder cover of the control cylinder may have a cup-shaped member flanged to it and this cup-shaped member may contain ball bearings carrying the compressed air cylinder. A solenoid-operated valve for admitting and shutting off the compressed air is suitably incorporated in the compressed air conduit leading to the compressed air cylinder. The control cylinder may be provided with a duct, through which leakage oil is thrown off so that leakage oil cannot enter between the clutch discs, where it would reduce the friction.

Another advantage of the clutch according to the invention resides in that manufacturing tolerances can easily be compensated by the control of the amount of filling oil so that substantial costs can be saved during the manufacture.

A multiple disc clutch embodying the invention is shown by way of example in the drawing.

Figure 1:
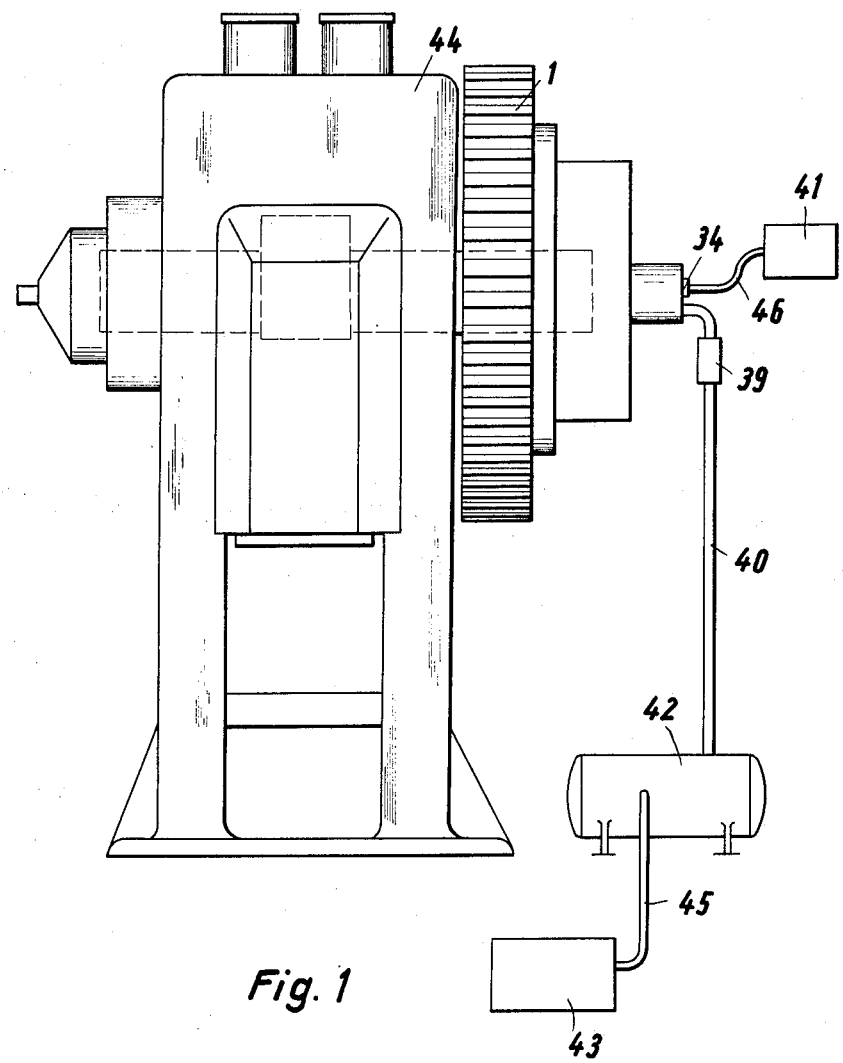
FIG. 1 is a general view of the installation with the clutch attached to a press.
Figure 2:
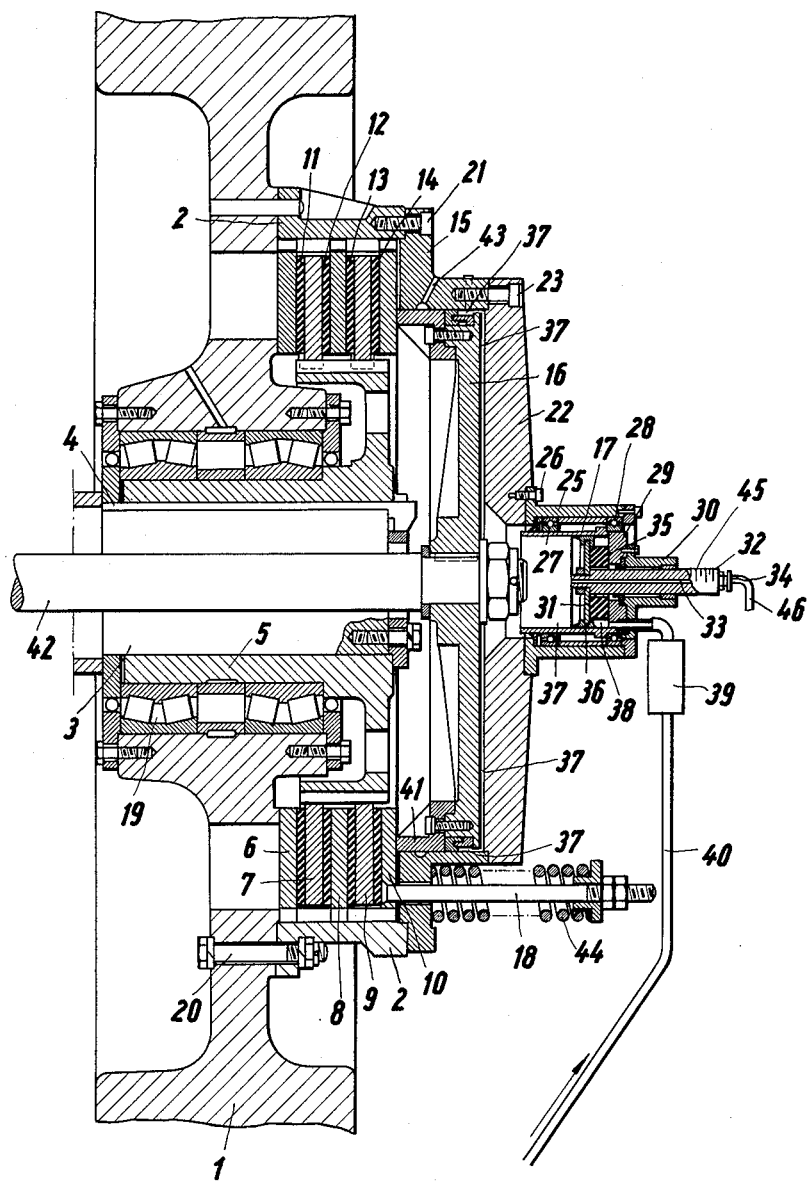
FIG. 2 is a sectional view showing the clutch.

The multiple disc clutch firmly connected to a driving gear 1 and comprises a clutch housing 2, a disc carrier 5 firmly connected by a key 4 to a driving shaft 3, discs 6 to 10, intervening friction linings 11 to 14, a control cylinder 15 which is mounted on the clutch housing 2 and comprises a piston 16, a compressed air cylinder 17 and a spring-loaded return bolt 18. A free-wheel 19 is incorporated between the disc carrier 5 and the gear 1. The clutch housing 2 is connected by a flange and bolts and nuts 20 to the gear 1. Screws 21 secure the control cylinder 15 to the clutch housing 2. A cylinder cover 22 is secured by screws 23 to the control cylinder 15.

A cup-shaped member 25 is mounted by screws 26 on the cylinder cover 22 and contains two ball bearings 27 and 28 carrying the compressed air cylinder 17. A cover 29 of the compressed air cylinder 17 carries a guide sleeve 30, in which a piston rod 32 is guided, which carries a piston disc 31. The piston rod 32 has a bore 33 and at its outwardly protruding end carries a filling pipe 34. An elastic buffer 35 is disposed behind the cover 29 and serves as a yielding stop for the piston disc 31. A sealing ring 36 is mounted on the rim of the piston disc 31 to ensure a good seal between the oil-filled chamber 37 at the rear of the piston 31 and the compressed air-filled chamber 38 in front of the piston 31. A compressed air conduit 40 incorporating a solenoid-operated valve 39 opens into the chamber 38.

The piston 16 of the control cylinder 15 has connected to it by screws a ring 41, which compresses the discs 6 to 10 and the friction linings 11 to 14 when pressure is admitted to the piston 16. For this purpose, the discs 6 to 10 are axially slidably mounted in grooves in alternation on the inside wall of the clutch housing and on the disc carrier 5. A piston rod 42 of the piston 16 is slidably mounted in the hollow driving shaft 3 and forms a pull rod for the brake, not shown, of the press.

The cylinder housing 15 has a bore 43, through which any leakage oil is thrown off so that it cannot enter between the clutch discs, where it would reduce the friction.

The mode of operation of the clutch according to the invention is as follows:

When the solenoid-operated valve 39 is opened, compressed air flows into the chamber 38 and forces the piston disc 31 to the left into the chamber 37. The oil contained in the chamber 37 acts on the piston 16, the ring 41 of which compresses the discs 6 to 10 so that the clutch rotating with the gear 1 is connected to the shaft 3. The compressed air cylinder 17 does not rotate with the clutch housing but remains stationary because it is carried by the ball bearings 27, 28 mounted in the rotating cup-shaped member 25. To disengage the clutch, the air is vented from the chamber 38 in front of the piston and the springs 44 acting on the bolt 18 urge the piston 16 back to its initial positions. By means of the oil in the chamber 37, the piston disc 31 is also urged back to its initial position so that the gear 1 is again freely rotatable.

In the course of time, the thickness of the friction linings 11 to 14 is reduced as a result of wear so that the displacement of the piston 16 is increased. If compressed air were admitted to the piston 16, the consumption of compressed air would also increase and with it the operating costs. In the clutch according to the invention this disadvantage is eliminated in a simple manner by filling additional hydraulic oil through the filling pipe 34 and the bore 33 formed in the piston rod 32 and opening into the chamber 37 so that the wear of the friction linings is compensated and the displacement of the piston 16 is maintained as constant as possible. The wear of the friction linings can be read from a scale 45 provided on the piston rod 32 in order to ascertain whether a refilling of oil is required. The refilled oil compensates the clearance space resulting from the wear. Manufacturing tolerances can also be compensated in this manner. The filling pipe 34 is fed with hydraulic oil from an oil pump 41 through a conduit 46 when this is required because the coupling discs 11, 12, 13, 14 have worn in the course of time and the chamber 37 has increased.

The chamber 38 disposed in the compressed air cylinder 17 in front of the air-operated piston is supplied with compressed air through a conduit 40, which incoporates a solenoid-operated valve 39 and leads from the compressed air container 42, which is fed from a compressor installation 43 through a conduit 45.

FIG. 1 shows the clutch applied to a large lever press 44.

The invention affords the great advantage that the clutch can be disengaged and engaged, respectively, within very short times because it is sufficient for this purpose to empty and fill the small compressed air chamber 38.

The invention is by no means restricted to the illustrative embodiment described hereinbefore. Many changes and modifications are possible within the scope of the invention. For instance, the piston disc 31 may also be operated with oil rather than with compressed air and the scale 45 may be replaced by an electrical limit switch, which initiates the operation of an alarm when oil must be refilled.

What is claimed is:

1. A multiple disc clutch, comprising, in combination, a driving rotary clutch member, a driven clutch member, a clutch housing, discs disposed between said clutch members, friction linings disposed between adjacent discs, said discs and linings being movable in axial direction and said discs being alternatively connected to said driving member and said driven member for rotation therewith, a first piston adapted to apply pressure to the discs and linings and to relieve them from pressure, a housing constituting a guide cylinder for said piston, a working fluid adapted to be applied in a pressurized state to the first piston and to be relieved from pressure, said working fluid being disposed in the substantially closed space between said first piston and said guide housing, a second piston adapted to increase and decrease said substantially closed space and thus to relieve the working fluid in said space from pressure and to pressurize said working fluid in said space, a guide cylinder for said second piston, a working fluid adapted to be applied under pressure to the second piston in accordance with the cycle of the clutch and to be relieved from pressure, a piston rod connected to said second piston, said piston rod extending through the guide cylinder for said second piston, said piston rod having a longitudinal opening communicating at one end with the space between said first piston and the guide housing for said first piston, and communicating at the other end with a filling pipe for said working fluid disposed between said first piston and its guide housing, said filling pipe being provided with a closure.

2. A multiple disc clutch as set forth in claim 1, which comprises further, in combination, a scale provided on said piston rod carried by said second piston and adapted to enable a reading of the amount of the fluid disposed between said first piston and its guide housing.

3. A multiple disc clutch as set forth in claim 1, which comprises further, in combination, a cover member of said guide cylinder for the second piston, which cover member is disposed opposite to said second piston, and elastic means arranged between said cover member and an end face of said second piston facing said cover member.

4. A multiple disc clutch as set forth in claim 1; which comprises further, in combination, a cup-shaped member carried by said guide cylinder for said second piston, said guide cylinder for the second piston and the second piston itself being accommodated and mounted by means of a bearing in said cup-shaped member to provide for a stationary arrangement of the guide cylinder for the second piston.

5. A multiple disc clutch comprising, in combination, a rotary driving member; a rotary driven member coaxial with the driving member; a plurality of discs between said members; friction linings between adjacent discs, said discs and linings being movable in axial direction and said discs being alternatingly connected to said driving member and to said driven member, respectively, for rotation therewith; a first guide cylinder fixed to one of said members; a first piston guided in said first guide cylinder movable between an active position and an inactive position and cooperating in said active position with said discs and linings for applying pressure in axial direction thereto to place the same in driving engagement, said cylinder and said piston defining on one side of the latter substantialy closed space; a working fluid filling said space; a second guide cylinder communicating at one end thereof with said space and being closed at the other end thereof; a second piston slidably guided in said second guide cylinder between a working stroke moving toward said one end of said second cylinder to thereby pressurize the fluid in said space and to move said first piston to its active position, and a return stroke relieving the pressure on the fluid in said space; means for feeding a pressure fluid into said second guide cylinder in the space between said closed end thereof and said second piston so as to move said second piston along its working stroke and to discharge pressure fluid from said second guide cylinder; and means communicating with said space for feeding additional working fluid thereinto to compensate for wear of said linings so that the working stroke of said second piston may be held substantially constant.

6. A multiple disc clutch as set forth in claim 5, which comprises means adapted to discharge any working fluid which has penetrated between the sealing surfaces between said first piston and the guide housing for the first piston before said working fluid reaches the discs.

References Cited by the Examiner

UNITED STATES PATENTS

| | | | |
|---|---|---|---|
| 1,938,780 | 12/1923 | Nenninger et al. | |
| 2,057,876 | 10/1936 | Berry. | |
| 2,120,798 | 6/1938 | Criley | 192—85 |
| 2,538,997 | 1/1951 | Weiland | 192—85 |

DAVID J. WILLIAMOWSKY, *Primary Examiner.*